United States Patent
Anderson

(10) Patent No.: US 9,670,950 B2
(45) Date of Patent: Jun. 6, 2017

(54) ELEVATOR HANDRAIL ATTACHMENT MECHANISM

(71) Applicant: Michael Anderson, Middleton, IN (US)

(72) Inventor: Michael Anderson, Middleton, IN (US)

( * ) Notice: Subject to any disclaimer, the term of this patent is extended or adjusted under 35 U.S.C. 154(b) by 459 days.

(21) Appl. No.: 14/543,113

(22) Filed: Nov. 17, 2014

(65) Prior Publication Data

US 2016/0137457 A1    May 19, 2016

(51) Int. Cl.
*B66B 11/02* (2006.01)
*F16B 13/00* (2006.01)
*F16B 13/08* (2006.01)
*F16B 35/00* (2006.01)

(52) U.S. Cl.
CPC ...... *F16B 13/0808* (2013.01); *B66B 11/0226* (2013.01); *F16B 35/005* (2013.01)

(58) Field of Classification Search
CPC ............. B66B 11/0226; E04F 11/1842; F16B 13/0808; F16B 35/005
USPC ............................... 187/401; 29/428; 52/832
See application file for complete search history.

(56) References Cited

U.S. PATENT DOCUMENTS

| | | | |
|---|---|---|---|
| 4,153,234 A | 5/1979 | Sherwood | |
| 5,215,418 A * | 6/1993 | Trainer | F16B 13/0808 411/169 |
| 5,405,115 A | 4/1995 | Reed | |
| 7,987,948 B2 | 8/2011 | Yoon | |
| 2009/0053007 A1 * | 2/2009 | Rafaeli | F16B 13/0808 411/344 |
| 2010/0252792 A1 * | 10/2010 | Bennett | A47K 17/022 256/21 |

FOREIGN PATENT DOCUMENTS

DE    102006019172    * 10/2007    ......... B66B 11/0226

OTHER PUBLICATIONS

Declaration of Michael Anderson dated Mar. 7, 2015.

* cited by examiner

*Primary Examiner* — William E Dondero
*Assistant Examiner* — Diem Tran
(74) *Attorney, Agent, or Firm* — Woodard, Emhardt, Moriarty, McNett & Henry LLP

(57) ABSTRACT

The present invention relates to a mechanism and method for rigidly mounting a handrail to the interior of an elevator cab. The mechanism includes a threaded rod having a pivoting member at one end for passing through an existing or new opening in an elevator cab wall. Upon passing through the wall, the pivoting member can rotate to provide a brace against the exterior of the elevator cab wall. A base portion having a number of grooves on its exterior surface and threads on its interior surface threads onto the rod to create a solid connection to the cab's wall. The handrail, having a base portion receiver, is then securely attached to the cab by sliding over it the sleeve and having set screw(s) inserted through the handrail's receiver at points adjacent to the corresponding grooves in the sleeve.

19 Claims, 2 Drawing Sheets

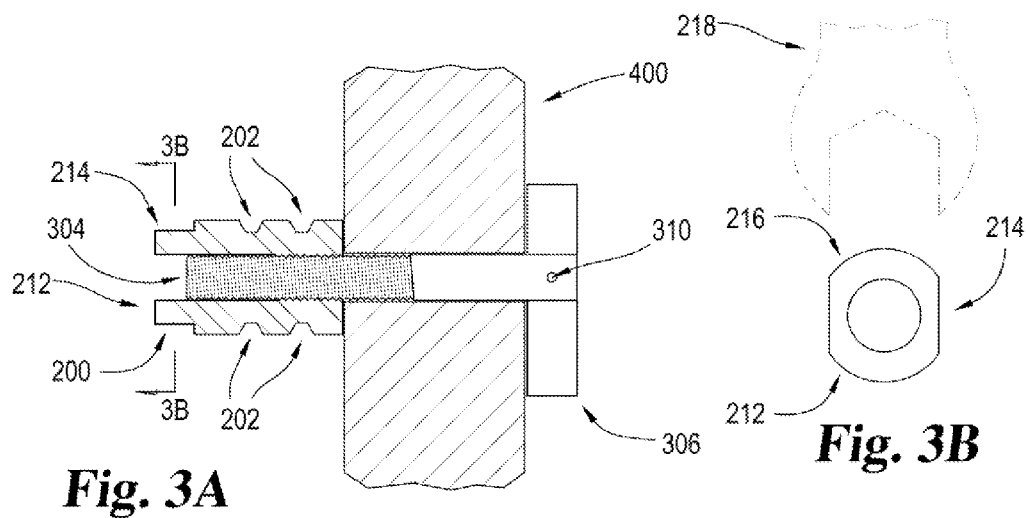
*Fig. 3A*  *Fig. 3B*
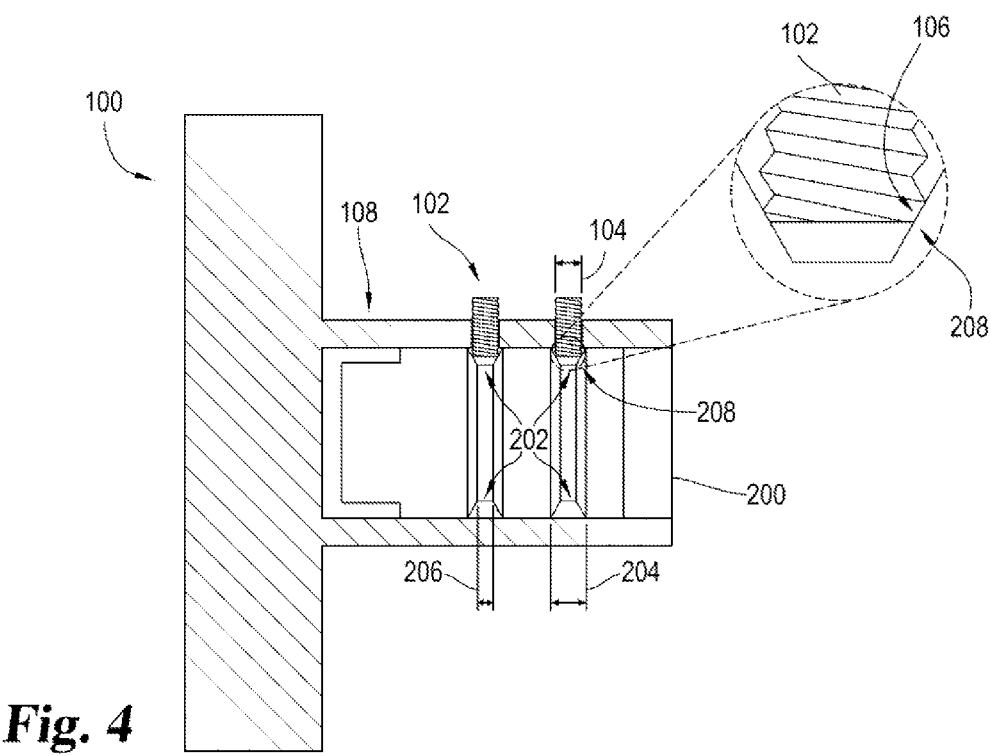
*Fig. 4*

ELEVATOR HANDRAIL ATTACHMENT MECHANISM

FIELD OF THE INVENTION

The present disclosure broadly concerns interior cabs for elevators. More particularly, the present disclosure relates to a mechanism and method for rigidly mounting a handrail to the interior of an elevator cab.

BACKGROUND

Passenger elevators began as a convenience in the early 1900s, but have since grown in popularity. In addition to convenience, elevators are now required by law in many new buildings. Given these expectations, the number of elevators currently in service in the United States is approaching one million, with the overwhelming majority of these elevators having been installed within the last fifty years.

Elevators are high traffic areas and are often utilized most by as occupants and visitors are coming and going from a building, particularly in the case of a commercial building, such as an office tower. Accordingly, building owners and their interior designers are frequently looking to present an appealing fit and finish within the interior of their elevators. Furthermore, after a certain period of time, the interior of an elevator cab needs to be renovated due to wear and tear or simply to update its look to match that of the rest of the building's interior. To accomplish such an update to an elevator, retrofit kits are custom made which include a number of panels and decorative items. These kits can be installed in place of the original interior within the elevator cab.

One common accessory included within the interior of most elevators is a handrail. Mounting the handrail securely must be done properly to ensure that the handrail is structurally secure. Traditional methods of retrofitting a handrail require that the installer have access to the exterior of the cab in order to secure fasteners to the end of bolts passing through the cab's wall from the interior or vice versa.

To access the exterior of the elevator cabin, the installer generally must access the elevator shaft. The elevator shaft can be a hazardous location, especially in the case of the retrofit of new handrails to an existing elevator. In this case, the elevator shaft can have accumulated much dirt, grime, or slippery surfaces (such as from lubricant). The elevator shaft can alternatively contain allergens, mold, or other health hazards. If the building is of sufficient age, the elevator shaft can also contain asbestos. In these cases, installers will be required to wear protective equipment which increases costs associated with the handrail installation and makes the process more cumbersome. In addition, in some situations, specialized laborers and/or authorized representatives of the elevator manufacturer are required to access the elevator shaft. Conversely, the interior of elevator cabins easy to access and are generally well maintained so as to comply with safety standards and to appease the users of the elevators.

Having the ability to install a handrail from the interior of the elevator cabin generally reduces the amount of labor required to replace elevator handrails, regardless of the conditions of the elevator shaft. The use of a nut or other capture device on the exterior of the elevator generally requires the installation personnel to be positioned on the exterior of the elevator, especially in the case of a retrofit. Some elevators have capture devices mounted directly into their side walls, but at times it may be desirable to install new capture devices at new locations or the mounted capture device may periodically require replacement, such as if they are old and have seized.

In the case that a capture device is added to the exterior of the elevator cabin, additional personnel may be needed as opposed to a system where the work can be performed from solely within the cabin. This is because an individual is needed to hold the nut from outside of the cabin and another is needed to thread a corresponding member into the nut from the interior of the cabin.

Additionally, the bolts used to secure the fasteners can loosen over time due to use by persons and vibrations from the travel of the elevator. It is preferable to have a mechanism by which the installation and tightening of a retrofit handrail can be accomplished while working solely from the interior of the elevator cab. Additionally, it is desirable to prevent loosening of the handrail as it is used over time.

SUMMARY

The present disclosure includes certain embodiments for methods and apparatus for installing handrails into cabins of elevators. Embodiments in the disclosure beneficially enable the installation of elevator handrails solely from the interior of the cabin of the elevator. The installation from the interior of the cabin increases the safety of the installation personnel by mitigating the need to reach the exterior of the elevator via the inside of the elevator shaft.

One embodiment includes a substantially three part apparatus to enable installation of elevator handrails from the interior of the elevator cabin. The three main parts of the apparatus are the handrail, the metal base, and the metal shaft. The metal shaft can be inserted through an existing or new opening in the elevator wall. After it is inserted through the elevator wall, the state of the metal shaft can change such that it can no longer be retracted from the elevator wall. In this manner, the metal shaft can brace against the exterior of the elevator similar in fashion to what a nut or other capture device would do.

A portion of the metal shaft can remain extended into the interior of the elevator cabin. Advantageously, this portion of the metal shaft is threaded such that a metal base can be threaded onto the metal shaft. The metal base can therefore apply pressure to the interior of the elevator wall. In this manner, the metal base and the metal shaft can work in tandem to brace the elevator wall from two sides and provide a secure mounting point to the elevator wall.

After the metal base is threaded onto the metal shaft, a handrail can then be inserted onto the metal base. A receiver mounted to the handrail can be used to securely mount the handrail to the metal base. The metal base can include a groove on its exterior such that a corresponding set screw on the receiver can be extended into the groove. A groove is beneficial as opposed to a circular or closed opening in that it enables the entire metal base to be rotated in order to thread the metal base onto the metal shaft.

Advantageously, the metal base can include multiple grooves and the handrail can contain multiple corresponding set screws. The profile of the grooves can also be configured to enable the set screws to self-guide into the correct position. For example, the grooves can be V shaped such that the width between the shoulders of the groove towards the exterior of the metal base is wider than the width of the shoulders towards the interior of the metal base. The width of the set screw can then correspondingly be configured to fall between the minimum and maximum widths of the groove.

Using such a configuration enables the distance between the handrail and the elevator wall to self-adjust as set screw(s) are threaded into the channel. Additionally, the set screw profile can be chosen to match the profile of the groove to further improve the self-aligning feature and increase the surface area contact between the set screw and the groove (and ultimately improving the stability of the handrail) after the set screw is threaded into the groove.

Further objects, features and advantages of the present invention shall become apparent from the detailed drawings and descriptions provided herein. Each embodiment described is not intended to address every object described herein, and each embodiment does not include each feature described. Some or all of these features may be present in the corresponding independent or dependent claims, but should not be construed to be a limitation unless expressly recited in a particular claim.

BRIEF DESCRIPTION OF THE DRAWINGS

FIG. 3A is a side view of the metal shaft and metal base of FIG. 1 in a configuration bracing an elevator wall.

FIG. 3B is a detail view of the proximal end of the metal base illustrated in FIG. 3A.

FIG. 4 is a side view of the handrail and metal base of FIG. 1 in a configuration where the handrail is securely attached to the metal base.

DETAILED DESCRIPTION

Figure 1:
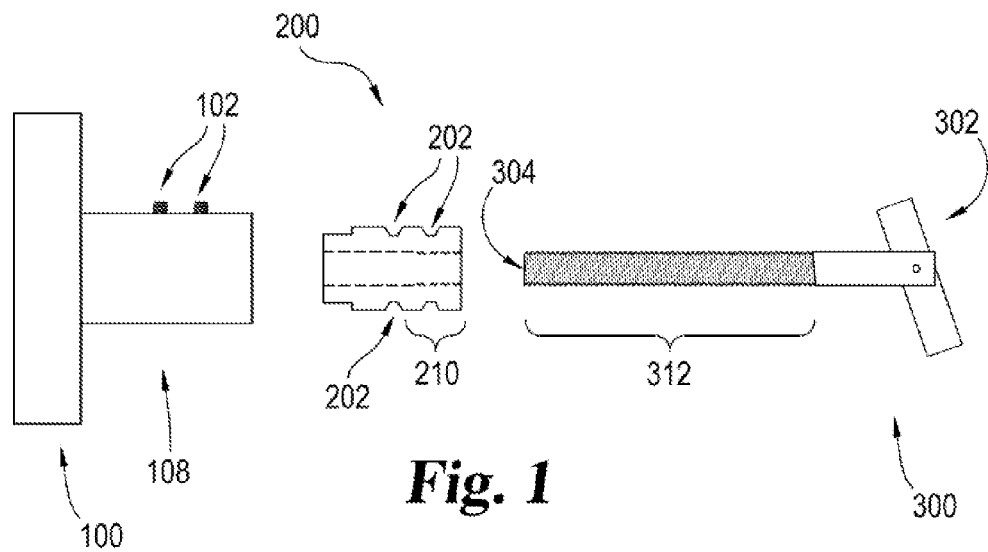
FIG. 1 is a side view of an apparatus to secure elevator handrails to the interior of an elevator cabin as one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. Additionally, in the following description, like reference characters designate like or corresponding parts throughout the several views.

The present disclosure relates generally to elevator handrails and in particular to apparatus and methods for securing elevator handrails to elevator chasses. The disclosure enables mounting of handrails onto elevator chasses solely from the interior of the cabin of the elevator.

A typical installation would include anywhere from 3-6 mechanisms per handrail, with those being spaced along the horizontal length of the handrail. The mechanism includes a threaded rod having a pivoting member at one end for passing through an existing or new opening in the elevator cab's wall. Upon passing through the wall, the pivoting member can rotate, such as by gravity or otherwise, to provide a brace against the exterior of the elevator cab wall. A base portion having a number of grooves on its exterior surface and threads on its interior surface can then threaded onto the rod and tightened down to create a solid connection to the cab's wall. The handrail, having a base portion receiver, is then securely attached to the cab by sliding over it the sleeve and having a pair of set screws inserted through the handrail's receiver at points adjacent to the two grooves in the sleeve. In this manner, the screws maintain the sleeve within the receiver in a secure fashion.

FIG. 1 illustrates an exploded view of an example handrail mounting apparatus. The handrail 100 is mounted to the base portion 200 which in turn is mounted to a metal shaft 300. The handrail 100 is used by individuals inside of the elevator in order to steady themselves when the elevator is accelerating or decelerating and is particularly advantageous for individuals with handicaps. It is beneficial for the handrail to be able to support a sheer force of 250 pounds or more in order to accommodate people of varying statures and meet elevator handrail regulations. Any portion of the handrail mounting apparatus may be made of metal or composite. It is beneficial for certain components to be made of metal as metal is a readily available material that is resilient, relatively easy to work with, and has well known properties.

The handrail 100 can mount to the base portion 200 through the use of a receiver 108 that can be configured to securely receive the base portion 200, as illustrated. The receiver may be integrated into handrail 100 or may be a separate component which is otherwise securely attached to the handrail 100. In this example, the receiver 108's inner diameter is slightly larger than the outer diameter of the base portion 200. The receiver 108 includes one or more set screws 102 that can be extended into corresponding channels 202 of the base portion 200 when it is properly positioned within the receiver 108. The set screws secure the handrail to resist the handrail from inadvertently being separated from the base portion 200 and the wall of the elevator.

Figure 2:
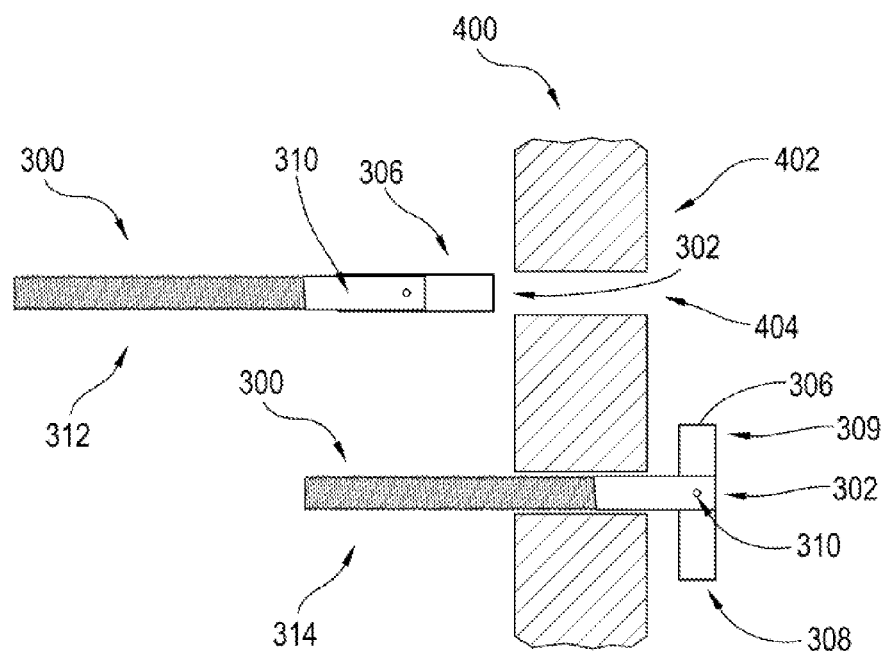
FIG. 2 is a side view of the metal shaft of FIG. 1 inserted through an elevator wall.

The base portion 200 can also include, on a central bore, a female threaded portion 210 (shown in broken lines) that is complementary to a male threaded portion 312 of the metal shaft 300. The interaction between these male and female threaded members can secure the base portion 200 to the metal shaft 300. The metal shaft 300 includes a proximal end 304 and a distal end 302. The distal end 302 can be inserted through the wall 400 of an elevator chassis as illustrated in FIG. 2. The female threaded portion 210 of the base portion 200 can optionally extend through the entire central bore or any portion of the central bore.

FIG. 2 illustrates the two states of the metal shaft 300 illustrated in FIG. 1. In the example illustration, the state transitions are enabled through the use of a pivoting member 306 that pivots around pivot point 310. When in the first configuration 312, the distal end 302 of the metal shaft 300 can be inserted through an opening 404 on the interior side of the elevator wall 400. After insertion through the opening 404 of the elevator wall 400, the metal shaft 300 can be transitioned to its second configuration 314. This state transition can be aided by gravity acting upon the pivoting member 306 by rotating the metal shaft 300. Other mechanisms and/or structures for accomplishing this state change may be utilized, such as an expansion anchor, toggle bolt, molly bolt, winged anchor or the like. When in the second configuration, the metal shaft cannot be retracted through the opening of the elevator wall. In this example, the pivoting member 306 rotates and substantially prevents the retraction of the metal shaft 300 by clamping the distal side 402 of the elevator wall 400.

Optionally, the pivoting member 306 can have an offset pivot point 310 such that the pivoting member has a longer side 308 and a shorter side 309. The longer side 308 can be configured such that the pivoting member 306 cannot rotate through a whole 360 degrees of movement. Particularly, the length of the longer side 308 can be selected such that rotating the pivoting member in any direction will cause the longer side 308 to impact the body of the rest of the metal shaft 300. This feature is advantageous as it aids in preventing the state of the metal shaft from inadvertently transitioning from the second configuration to the first configuration and therefore prevents the metal shaft from inadvertently being retracted from the opening 404 in the elevator wall 400.

FIG. 3A further illustrates the inclusion of the metal base portion 200 being coupled to the metal shaft 300 with wall 400 therebetween. As illustrated, the metal shaft 300 is in the second configuration to prevent its retraction and to brace the distal side of the wall 400 of the elevator. The base portion 200 can include a central female threaded portion 210 to engage the male threaded portion 312 of the metal shaft 300. Therefore, the base portion 200 can be threaded onto proximal end 304 of the metal shaft 300. Thread-locking fluid may be utilized to ensure the long-term strength of this engagement.

The length of threaded portion 210 and base portion 200 enables walls of varying thickness to be accommodated. If the base portion 200 is sufficiently threaded onto the metal shaft 300, the base portion 200 and the pivoting member 306 of the metal shaft 300 will brace opposite sides of the elevator wall 400 and therefore brace the wall securely. Any excess of metal shaft 300 which extends from the opposite end of base portion 200 may be cut off. The channels 202 on the exterior of the base portion 200 can then be securely established in the desired location within the interior of the elevator cabin to support the handrail 100 and provide secure mounting locations.

The proximal end 212 of the base portion 200 can optionally include flat sided portions 214 on opposite sides of the base portion for use with a wrench. Alternatively, the proximal end 212 can include any number of metal flat sides such that the profile of the proximal end 212 can form a hexagon, octagon, or other shape. These shapes enable the use of a standard wrench 218 as shown in FIG. 3B. FIG. 3B shows a view of the proximal end 212 of the base portion 200 as viewed according to FIG. 3A. The proximal end contains flat sides 214 which can interrupt the circular curvature 216 of the proximal end 212 of the base portion 200. The flat sides 214 can also be chosen to correspond to a socket wrench. The ability to use a wrench 218 to torque the base end 200 onto the metal shaft 300 simplifies the installation process by allowing the use of more standardized tools during the installation and therefore reduces installation costs.

FIG. 4 illustrates the mounting of the handrail 100 to the base portion 200. The metal shaft 300 has been omitted for clarity. A receiver 108 of the handrail 100 is illustrated being placed over the exterior of the base portion 200. The receiver 108 includes two set screws 102 and 104 oriented such that they can be threaded into the channels 202 of the base portion 200. Beneficially, shoulders 208 of the channel 202 are configured such that the width between the shoulders decreases towards the center of the base portion 200 (towards the central bore). This aids in the correct positioning of the handrail 100 as the set screws 102 and 104 can contact the shoulder 208 of the channel 200 if it is off center and move the handrail 100 as the set screw 102 is threaded into the channel until the handrail 100 is correctly aligned. In addition, this contact between the set screws 102 and 104 and the channels 202 provides lateral bracing to prevent the handrail from being pushed toward or pulled away from the elevator's interior wall. Again, thread-locking fluid may be utilized to secure this engagement.

Additionally illustrated is an optional configuration of the distal portion of the set screw 102 where it contacts the channel 202. In this configuration the profile 106 of the distal end of the set screw 102 substantially complements the profile of the shoulders 208 of the channel 200. In this configuration, the contact area between the set screw 102 and channel 200 is maximized and therefore improves the stability of the handrail 100 after it is mounted.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the invention as described herein and/or by the following claims are desired to be protected.

What is claimed is:

1. A mechanism for securing a handrail to an interior of an elevator cab, the mechanism comprising:
    a metal shaft having a male threaded portion extending from its proximal end toward its distal end wherein in a first configuration the distal end of the metal shaft is configured to be extended through an opening of a wall and in a second configuration is configured such that the metal shaft cannot be retracted through said opening by means of bracing against a side of said wall facing said distal end wherein a transition of the first configuration to the second configuration of the metal shaft is enabled through the use of a pivoting member attached to and located towards the distal end of the metal shaft;
    a metal base portion having a central bore, at least a portion of said bore defining a female threaded surface for engaging the male threaded portion of said shaft, and an exterior surface having a recessed channel therein, wherein a width between shoulders of said recessed channel decreases when viewed in a direction towards said central bore; and
    an elevator handrail having a plurality of receivers secured thereto, at least one of said receivers having a bore suitable for securely accepting said metal base portion; said receiver also including a set screw passing from an outer surface of said receiver and into said bore, wherein said set screw has a diameter which is less than a width of said recessed channel at its greatest width but greater than a width of said recessed channel at its smallest width.

2. The mechanism for securing a handrail to the interior of an elevator cab of claim 1, wherein the plurality of receivers are made entirely of metal.

3. The mechanism for securing a handrail to the interior of an elevator cab of claim 2, wherein the metal base portion further comprises at least a pair of flat surfaces formed in said exterior surface for engaging a wrench.

4. The mechanism for securing a handrail to the interior of an elevator cab of claim 1, wherein said metal base portion further comprises two recessed channels of decreasing width when viewed in a direction towards said central bore and said elevator handrail comprises two corresponding set screws configured and arranged to engage said two recessed channels.

5. The mechanism for securing a handrail to the interior of an elevator cab of claim 1, wherein the material defining said opening of said wall is metal.

6. The mechanism for securing a handrail to the interior of an elevator cab of claim 1, wherein the mechanism when assembled and attached to an elevator wall is configured to withstand a 250 pound sheering force applied to said handrail without being damaged.

7. The mechanism for securing a handrail to the interior of an elevator cab of claim 1, a pivot point of said pivoting member is offset such that the pivoting member is restricted from continuously spinning in any direction via contact with the rest of the metal shaft.

8. The mechanism for securing a handrail to the interior of an elevator cab of claim 1, wherein the transition between the first configuration and the second configuration of the metal shaft is accomplished through gravity acting upon the pivoting member.

9. The mechanism for securing a handrail to the interior of an elevator cab of claim 1, wherein the set screw includes a portion that is substantially complementary to a profile of the recessed channel.

10. A method for securing a handrail to an interior of an elevator cab, the mechanism comprising:
- inserting a distal end of a metal shaft having a male threaded portion extending from its proximal end toward its distal end and the metal shaft including a pivoting member being in a first configuration through an opening in a wall;
- changing the configuration of said pivoting member such that the metal shaft cannot be retracted through said opening by means of the metal shaft bracing against a side of the wall facing the distal end of the metal shaft;
- threading a metal base portion onto the male threaded portion of said metal shaft, securely bracing the metal base portion against the side of the wall facing the proximal end of the metal shaft, the metal base portion having a pair of recessed channels on its outer surface with a width between shoulders of the recessed channel decreasing when viewed in a direction towards said central bore; and
- mounting an elevator handrail to said base portion by mounting one of a plurality receivers of said handrail onto said metal base portion using a pair of set screws each configured to extend into one of said recessed channels.

11. The method for securing a handrail to the interior of an elevator cab of claim 10, wherein the plurality of receivers are made entirely of metal.

12. The method for securing a handrail to the interior of an elevator cab of claim 10, wherein the recessed channels run parallel to one another in the surface of said metal base portion.

13. The method for securing a handrail to the interior of an elevator cab of claim 10, wherein pair of recessed channels have decreasing widths when viewed in a direction towards said central bore.

14. The method for securing a handrail to the interior of an elevator cab of claim 10, wherein the material defining said opening of said wall is metal.

15. The method for securing a handrail to the interior of an elevator cab of claim 10, wherein the mechanism when assembled and attached to an elevator wall is configured to withstand a 250 pound sheering force applied to said handrail without being damaged.

16. The method for securing a handrail to the interior of an elevator cab of claim 10, wherein the state transition of the metal shaft is enabled through the use of a pivoting member attached to and located towards the distal end of the metal shaft.

17. The method for securing a handrail to the interior of an elevator cab of claim 16, the pivot point of said pivoting member is offset such that the pivoting member is restricted from continuously spinning in any direction via contact with the rest of the metal shaft.

18. The method for securing a handrail to the interior of an elevator cab of claim 10, wherein the transition from the first configuration of the metal shaft is accomplished through gravity acting upon the pivoting member.

19. The method for securing a handrail to the interior of an elevator cab of claim 10, wherein the set screw includes a portion that is substantially complementary to a profile of the recessed channel.

* * * * *